United States Patent
Silver

[15] 3,691,140
[45] Sept. 12, 1972

[54] ACRYLATE COPOLYMER MICROSPHERES

[72] Inventor: Spencer Ferguson Silver, 3 M Center, St. Paul, Minn. 55101

[22] Filed: March 9, 1970

[21] Appl. No.: 17,880

[52] U.S. Cl. .................260/78.5, 117/155, 117/161, 260/29.6, 260/30.4, 260/31.2, 260/32.8, 260/33.4, 260/33.6, 260/79.3, 260/80.73, 260/80.8, 260/80.81, 260/86.1 R, 260/86.1 N

[51] Int. Cl. .............................................C08f 15/26

[58] Field of Search....260/86.1 N, 79.3, 78.5, 80.73, 260/80.8, 80.81

[56] References Cited

UNITED STATES PATENTS

| | | | |
|---|---|---|---|
| 2,892,822 | 6/1959 | Gray et al. | 260/86.1 N |
| 3,257,478 | 6/1966 | Jubilee et al. | 260/86..1 N |
| 3,385,839 | 5/1968 | Honig et al. | 260/86.1 N |
| 3,428,617 | 2/1969 | Sobolev | 260/86.1 N |
| 3,485,806 | 12/1969 | Bloomquist et al. | 260/86.1 N |
| 3,527,802 | 9/1970 | Slagel | 260/86.1 N |

*Primary Examiner*—Harry Wong, Jr.
*Attorney*—Kinney, Alexander, Sell, Steldt & Delahunt

[57] ABSTRACT

Infusible, solvent-dispersible, solvent-insoluble, inherently tacky, elastomeric copolymer microspheres consist essentially of about 90 percent to about 99.5 percent by weight of at least one alkyl acrylate ester and about 10 to about 0.5 percent by weight of at least one monomer selected from the group consisting of substantially oil-insoluble, water-soluble, ionic monomers and maleic anhydride. The microspheres are prepared by aqueous suspension polymerization utilizing emulsifier in an amount greater than the critical micelle concentration in the absence of externally added protective colloids or the like.

19 Claims, No Drawings

ACRYLATE COPOLYMER MICROSPHERES

BACKGROUND OF THE INVENTION

This invention relates to inherently tacky, elastomeric, solvent-dispersible, solvent-insoluble, acrylate copolymer and a process of preparing the copolymer.

Aerosol spray adhesives have recently found commercial importance in the graphic arts for adhering paper to various substrates, as well as numerous other uses. Such adhesives have many desirable properties. For instance, they permit paper to be removed from a substrate to which it is adhered, without tearing; however, they do not permit rebonding. These adhesives generally comprise solvent dispersions of cross-linked rubbers or acrylates. Such polymers, while commercially utilizable, are not completely satisfactory because the cross-linking reaction is difficult to control and often provides soluble or partially soluble polymers. Soluble polymers are undesirable for spray adhesives having a non-volatile content above 10 percent because they do not atomize well and therefore fail to spray or form a "cobweb" spray pattern. Also, such polymers form agglomerates of random size, the large particles often plugging the spray nozzle orifice. Further, the polymer particles, when dry, agglomerate and are dispersible only with difficulty.

Despite the desirability of inherently tacky, elastomeric polymers which are solvent-dispersible, solvent-insoluble, and of uniformly small size, such a product has never heretofore existed.

SUMMARY

The invention provides inherently tacky, elastomeric, polymers which are uniformly solvent-insoluble, solvent-dispersible, of small size, and ideally suited for use in aerosol spray adhesives. The polymers easily disperse in various solvents to provide non-plugging suspensions which spray without cobwebbing. The polymers permit bonding of paper and other materials to various substrates, permit easy removal of bonded paper from the substrate without tearing, and also permit subsequent rebonding of the paper without application of additional adhesive.

The invention comprises infusible, solvent-dispersible, solvent-insoluble, inherently tacky, elastomeric, acrylate copolymer microspheres consisting essentially of about 90 to about 99.5 percent by weight of at least one alkyl acrylate ester and about 10 to about 0.5 percent by weight of at least one monomer selected from the group consisting of substantially oil-insoluble, water-soluble, ionic monomers and maleic anhydride. Preferably, the microspheres comprise about 95 to about 99 percent by weight acrylate monomer and about 5 to about 1 percent by weight ionic monomer, maleic anhydride, or a mixture thereof. The microspheres are prepared by aqueous suspension polymerization utilizing emulsifier in an amount greater than the critical micelle concentration in the absence of externally added protective colloids or the like.

Solvent suspensions of these microspheres may be sprayed by conventional techniques without cobwebbing or may be incorporated in aerosol containers with suitable propellants such as iso-butane, isobutylene, or the Freons. The tacky microspheres provide a pressure-sensitive adhesive which has a low degree of adhesion permitting separation, repositioning and rebonding of adhered objects. Additionally, these polymers are readily removable from surfaces to which they have been applied, much as rubber cements are removable by mere rubbing. Further, the tacky spheres resist permanent deformation, regaining their spherical shape upon release of pressure. They also exhibit a very low film or tensile strength, less than about 10 psi.

The alkyl acrylate ester monomer portion of the copolymer microspheres may comprise one ester monomer or a mixture of two or more ester monomers. Similarly, the water-soluble, substantially oil-insoluble monomer portion of the copolymer microspheres may comprise maleic anhydride alone, an ionic monomer alone, a mixture of two or more ionic monomers, or a mixture of maleic anhydride with one or more ionic monomers.

The alkyl acrylate ester portion of these microspheres consist of those alkyl acrylate monomers which are oleophilic, water-emulsifiable, of restricted water-solubility, and which, as homopolymers, generally have glass transition temperatures below about −20°C. Alkyl acrylate ester monomers which are suitable for the microspheres of the invention include iso-octyl acrylate, 4-methyl-2-pentyl acrylate, 2-methylbutyl acrylate, sec-butyl acrylate, and the like. Acrylate monomers with glass transition temperatures higher than −20°C. (i.e., tert-butyl acrylate, iso-bornyl acrylate or the like) may be used in conjunction with one of the above described acrylate ester monomers.

The water-soluble ionic monomer portion of these microspheres is comprised of those monomers which are substantially insoluble in oil. By substantially oil-insoluble and water-soluble it is meant that the monomer has a solubility of less than 0.5% by weight and, a distribution ratio at a given temperature (preferably 50°–65C.), of solubility in the oil phase monomer to solubility in the aqueous phase of less than about 0.005, i.e., $$D = \frac{\text{Total concentration in organic layer}}{\text{Total concentration in aqueous layer}}$$

Table I illustrates typical distribution ratios (D) for several water-soluble, substantially oil-insoluble ionic monomers.

TABLE I

| Oleophilic Monomer | Temp. °C. | Hydrophilic Monomer | D |
|---|---|---|---|
| iso-octyl acrylate | 50 | 1,1-dimethyl-1(2-hydroxypropyl)amine methacrylimide | 0.005 |
| do | 50 | 1,1,1-trimethylamine methacrylimide | 0.0015 |
| do | 65 | do | 0.003 |
| do | 50 | N,N-dimethyl-N-(β-methacryloxyethyl) ammonium propionate betaine | <0.002 |
| do | 65 | do | 0.003 |
| do | 65 | 4,4,9-trimethyl-4-azonia-7-oxo-8-oxa-dec-9-ene-1sulfonate | <0.002 |
| do | 65 | 1,1-dimethyl-1(2,3-dihydroxypropyl)amine methacrylimide | 0.0015 |
| do | 65 | sodium acrylate | <0.001 |
| do | 65 | sodium methacrylate | <0.001 |
| do | 65 | ammonium acrylate | <0.001 |
| do | 65 | maleic anhydride | 0.02 |

Ionic monomers conforming to the preceding criteria include sodium methacrylate, ammonium acrylate, sodium acrylate, (I) trimethylamine p-vinyl benzimide, (II) 4,4,9-trimethyl-4-azonia-7-oxo-8-oxa-dec-9-ene-1-sulphonate, (III) N,N-dimethyl-N-(β-methacryloxyethyl) ammonium propionate betaine, (IV) trimethylamine methacrylimide, (V) 1,1-dimethyl-1(2,3-dihydroxypropyl)amine methacrylimide; any zwitterionic monomer having the preceding solubility requirements, and the like. Structural formulas of these monomers are as follows:

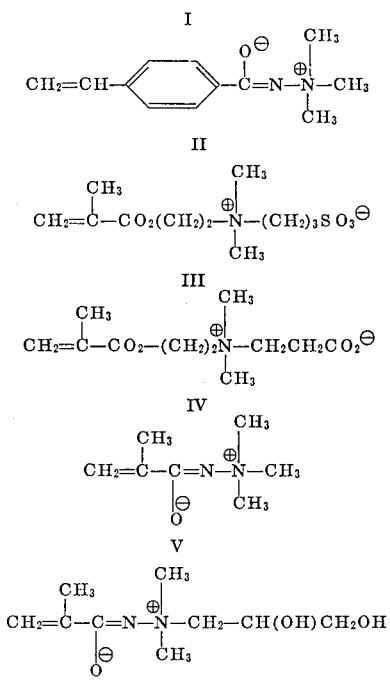

The copolymer microspheres are small in size, having diameters in the range of about 1 to about 250 microns, the diameter of the majority of the spheres falling in the range of about 5 to about 150 microns. The spheres are normally tacky and elastomeric, are insoluble in organic solvents, and form suspensions in all common solvents except highly polar solvents such as water, methanol, and ethanol. Typical useful solvents are ethyl acetate, tetrahydrofuran, heptane, 2-butanone and other ketones, benzene, cyclohexane, esters, isopropanol, and higher alcohols. When dispersed, the microspheres absorb the solvent and swell to about twice their original diameter, or about eight times their original volume. After dispersion, the microspheres, which contain about 80 percent solvent, remain homogeneously dispersed for extended periods of time. When the dispersed microspheres are sprayed or coated on a surface, the solvent quickly evaporates, the microspheres shrinking to approximately their original size. A force applied directly to one of the polymer spheres will deform it; however, the spherical shape is reassumed upon release of the stress. Upon being heated, the spheres do not melt or flow, but retain their integrity until carbonization temperature is reached. Tack properties of the microspheres may be altered by inclusion of various resins in the solvent or aqueous suspensions of microspheres.

The microspheres of the invention are prepared by an aqueous suspension polymerization technique utilizing anionic emulsifiers in an amount greater than the critical micelle concentration in the absence of protective colloids, finely divided inorganic solids, or the like. Heretofore, suspension polymerizations conducted in the absence of such materials and at high emulsifier levels, i.e., above the critical micelle concentration, have yielded latices of extremely small particle size, which are solvent-soluble, fusible particles. The critical micelle concentration is here defined as that minimum concentration of emulsifier necessary for the formation of micelles. Critical micelle concentration is slightly different for each emulsifier, usable concentrations ranging from about $1.0 \times 10^{-1}$ to about 3.0 moles/liter. Non-ionic emulsifiers may also be included so long as an anionic emulsifier is present and predominates. Catalysts for polymerizing the monomers to provide the spheres of the invention are those which are normally suitable for free-radical polymerization of acrylate monomers and which are oil-soluble and of very low solubility in water such as, for example, benzoyl peroxide. Use of a water-soluble catalyst causes formation of substantial amounts of latex, the extremely small particle size and solubility of latex particles being undesirable. Concentration of catalyst will affect sphere quality and, therefore, should be on the order of about 0.15 to about 0.6 percent by weight, of the total suspension, preferably about 0.25 to about 0.45 percent. Catalyst concentrations below about 0.15 percent may cause agglomeration of spheres, whereas a concentration greater than 0.6 percent results in low molecular weight polymer which does not exhibit all of the desired properties.

Following polymerization, the aqueous suspension of copolymer microspheres is stable to agglomeration or coagulation under room temperature conditions. The copolymer suspensions may have non-volatile solids contents from about 10 to about 50 percent by weight. Upon prolonged standing, the suspensions will separate into two phases, the lower phase being aqueous and substantially free of polymer, the upper phase being an aqueous dispersion of polymer spheres. Decantation of the upper phase provides a low viscosity aqueous suspension having a non-volatile solids content on the order of about 75 percent which, if shaken with water, will readily redisperse.

If desired, the aqueous dispersion of microspheres may be utilized immediately following polymerization to provide inherently tacky coatings or adhesives. The aqueous dispersion may be coagulated with methanol, saturated salt solutions, or the like, followed by washing and drying. These dried polymer spheres, with sufficient agitation, will readily suspend in the previously mentioned wide variety of common organic solvents. Once the polymer is dried however, it is not redispersible in water.

The shrinkage of individual microspheres during drying when in a coated continuous layer results in a porous coating of microspheres having particular utility for such items as surgical dressings or draperies, where passage of air and water vapor through the adhesive coating is necessary, conventional adhesives generally being continuous and retarding passage of air and water vapor.

DESCRIPTION OF PREFERRED EMBODIMENTS

EXAMPLE 1

This example illustrates a general method by which infusible, solvent-dispersible, solvent-insoluble, inherently tacky, elastomeric copolymer microspheres are prepared. A 3-liter indented resin flask fitted with mechanical stirrer was charged with 410 gms (90 mole percent) iso-octyl acrylate, 38 gms (10 mole percent) trimethylamine methacrylimide, 1500 ml deoxygenated distilled water, and 20 gms alkyl arylpolyethylene oxide sodium sulfonate (commercially available from the Rohm and Haas Company under the trade designation "Triton" X-200). The flask was purged with nitrogen, 1.5 gms benzoyl peroxide added, and the mixture heated to 66°C. and stirred vigorously (about 500 rpm) for 20 hours at 66°C. under nitrogen.

At the end of the 20 hours, the suspension was cooled to 20°C. and filtered through cheesecloth to remove agglomerates, and the solid polymer recovered by coagulation and washing with methanol, to provide a 95-98 percent yield of discrete microspheres ranging in diameter from about 10 to about 150 microns. The copolymer spheres were found to be dispersible, but insoluble in, iso-propanol, ethyl acetate, tetrahydrofuran, 2-butanone, benzene, and cyclohexane. Each of these dispersions, when placed in an aerosol container with propellant, was found to provide an excellent spray adhesive which sprayed without plugging or cobwebbing to provide a tacky adhesive layer which readily bonded paper but, permitted the paper to be removed, repositioned and rebonded. The microspheres were removable from the surface on which they were sprayed with an art gum eraser.

Films were cast from each of the above-mentioned dispersions, dried, and found to be of very low tensile strength and comprised of aggressively tacky spherical particles.

EXAMPLE 2

A 500 ml indented 3-neck flask fitted with a stirrer was charged with 150 ml of deoxygenated distilled water, 47.5 gms of iso-octyl acrylate, 2.5 gms of trimethylamine methacrylimide, 1.0 gms of ammonium lauryl sulfate (commercially available from the Alcolac Chemicals Co. under the trade designation "Sipex A"), and 0.15 g. of benzoyl peroxide. The mixture was heated to 65°C., maintained for 20 hours with rapid stirring (about 550 rpm), cooled to 20°C., and filtered through cheesecloth to provide a suspension of tacky copolymer microspheres on the order of 10 to 180 microns in diameter. After coagulation and washing with methanol, the tacky, elastomeric microspheres were found to be insoluble in, but dispersible in tetrahydrofuran, 2-butanone, and heptain.

EXAMPLES 3-10

These examples, all of which were prepared utilizing the equipment and general procedure outlined in Example 2, illustrate use of various emulsifiers and ionic monomers. Deoxygenated distilled water (150 ml), 0.15 gm of benzoyl peroxide, and the components shown in Table II were utilized in the polymerization and the polymer recovered by the techniques set forth in Example 2. The microspheres were found to be inherently tacky and pressure-sensitive, insoluble, infusible, and dispersible in organic solvents.

EXAMPLES 11-15

These examples, all of which were prepared utilizing the equipment and general techniques outlined in Example 2, illustrate use of various alkyl acrylate ester monomers for preparation of the copolymer microspheres of the invention. Deoxygenated distilled water (150 ml), 0.15 gm of benzoyl peroxide, and the components shown in Table III were utilized in the polymerization and the polymer recovered by the techniques set forth in Example 2. The microspheres, after polymerization and recovery, were found to be inherently tacky and pressure-sensitive, solvent insoluble, infusible, and solvent dispersible.

TABLE II

| Example | Iso-octyl acrylate, g. | Emulsifier, g. | Ionic monomer | Polymer particle size, microns |
|---|---|---|---|---|
| 3 | 45 | 2g. alkyl-arylpoly ethylene oxide sodium sulfonate | 5g. trimethylamine p-vinylbenzimide | 1-50 |
| 4 | do | do | 5g. 1-(2,3-dihydroxy-propyl)-1, 1-dimethylamine methacrylimide | 1-120 |
| 5 | do | do | 5g. N,N-dimethyl-N-($\beta$-methacryloxyethyl)ammonium propionate betaine | 20-150 |
| 6 | 49 | 1g. ammonium lauryl sulfate | 1g. ammonium acrylate | 6-52 |
| 7 | do | do | 1g. N,N-dimethyl-N-($\beta$-methacryloxyethyl)ammonium propionate betaine | — |
| 8 | do | do | 1g. 4,4,9-trimethyl-4-azonia-7-oxo-8-oxa-dec-9-ene-1sulfonate | 6-80 |
| 9 | do | 1g. sodium p-dodecyl benzene sulfonate | 1g. sodium acrylate | 3-39 |
| 10 | 45 | do | 5g. maleic anhydride | 6-39 |

TABLE III

| Example | Alkyl Acrylate Monomer gms. | Wetting agent, gm. | Ionic Monomer | Polymer particle size, microns |
|---|---|---|---|---|
| 11 | 45g. 4-methyl-2-pentyl acrylate | 2g. alkyl-arylpoly ethylene oxide sodium sulfonate | 5g. trimethylamine methacrylimide | 10-80 |
| 12 | 45g. 2-methyl butyl acrylate | 1g. p-dodecyl benzene sulfonate | 5g. maleic anhydride | 1-15 |
| 13 | 22.5g. iso-octyl acrylate; | 1g. ammonium lauryl sulfate | 5g. trimethylamine methacrylimide | 6-78 |

| | | | | |
|---|---|---|---|---|
| | methyl-2-pentyl acrylate | | | |
| 14 | 22.5g. iso-octyl acrylate; 22.5g. tert-butyl acrylate | do | do | 10–80 |
| 15 | 18g. 4-methyl-2-pentyl acrylate; 27 g., iso-bornyl acrylate | do | do | 10–140 |
| 16 * | 90g. iso-octyl acrylate | 4g. alkyl aryl polyethylene oxide sodium sulfonate | 10g. trimethylamine methacrylimide | 10–150 |

* 100 ml of deoxygenated distilled water and 0.3 g of benzoyl peroxide was utilized in this example.

I claim:

1. Infusible, non-polar organic liquid dispersible, non-polar organic liquid insoluble, inherently tacky, elastomeric copolymer microspheres consisting essentially of about 90 to about 99.5 percent by weight of one or more oleophilic, water-emulsifiable alkyl acrylate esters, at least one of said esters being selected from the group consisting of iso-octyl acrylate, 4-methyl-2-pentyl acrylate, 2-methylbutyl acrylate, and sec-butyl acrylate and about 10 to about 0.5 percent by weight of one or more monomers selected from the group consisting of trimethylamine methacrylimide, trimethylamine p-vinyl benzimide, ammonium acrylate, sodium acrylate, N,N-dimethyl-N-($\beta$-methacryloxyethyl) ammonium propionate betaine, 1,1-dimethyl-1-(2-hydroxypropyl) amine methacrylimide, 4,4,9-trimethyl-4-azonia-7-oxo-8-oxa-9-decene-1-sulphonate, 1,1-dimethyl-1-(2,3-dihydroxypropyl) amine methacrylimide, and maelic anhydride , said copolymer having been prepared by aqueous suspension polymerization in the presence of an anion emulsifier at a level above said emulsifier's critical micelle concentration.

2. The microspheres of claim 1 wherein the acrylate ester is iso-octyl acrylate and the ionic monomer is trimethylamine methacrylimide.

3. The microspheres of claim 1 wherein the acrylate monomer is iso-octyl acrylate and the ionic monomer is trimethylamine p-vinyl benzimide.

4. The microspheres of claim 1 wherein the acrylate monomer is iso-octyl acrylate and the ionic monomer is 1,1-dimethyl-1(2,3-dihydroxypropyl)amine methacrylimide.

5. The microspheres of claim 1 wherein the acry-late monomer is iso-octyl acrylate and the ionic monomer is N,N-dimethyl-N-($\beta$-methacryloxyethyl)ammonium propionate betaine.

6. The microspheres of claim 1 wherein the acrylate monomer is iso-octyl acrylate and the ionic monomer is ammonium acrylate.

7. The microspheres of claim 1 wherein the acrylate monomer is iso-octyl acrylate and the ionic monomer is 4,4,9-trimethyl-47-oxo-8-oxa-dec-9-ene-1-sulfonate.

8. The microspheres of claim 1 wherein the acrylate monomer is iso-octyl acrylate and the ionic monomer is sodium acrylate.

9. The microspheres of claim 1 wherein the acrylate monomer is iso-octyl acrylate and the other monomer is maleic anhydride.

10. The microspheres of claim 1 wherein the acrylate monomer is 4-methyl-2-pentyl acrylate and the ionic monomer is trimethylamine methacrylimide.

11. The microspheres of claim 1 wherein the acrylate monomer is 2-methylbutyl acrylate and the other monomer is maleic anhydride.

12. The microspheres of claim 1 containing at least two of said alkyl acrylate ester monomers.

13. The microspheres of claim 12 wherein the ionic monomer is trimethylamine methacrylimide and the acrylate monomers are iso-octyl acrylate and 4-methyl-2-pentyl acrylate.

14. The microspheres of claim 12 wherein the ionic monomer is trimethylamine methacrylimide and the acrylate monomers are iso-octyl acrylate and tert-butyl acrylate.

15. The microspheres of claim 12 wherein the ionic monomer is trimethylamine methacrylimide and the acrylate monomers are 4-methyl-2-pentyl acrylate and iso-bornyl acrylate.

16. Infusible, non-polar organic liquid dispersible, non-polar organic liquid insoluble, inherently tacky, elastomeric copolymer microspheres consisting essentially of about 98 to about 99.5 percent by weight of one or more oleophilic, water-emulsifiable alkyl acrylate esters, at least one of said esters being selected from the group consisting of iso-octyl acrylate, 4-methyl-2-pentyl acrylate, 2-methylbutyl acrylate, and sec-butyl acrylate and about 2 percent to about 0.5 percent by weight of one or more monomers selected from the group consisting of trimethylamine methacrylimide, trimethylamine p-vinyl benzimide, ammonium acrylate, sodium acrylate, N,N-dimethyl-N-($\beta$-methacryloxyethyl) ammonium propionate betaine, 1,1-dimethyl-1-(2-hydroxypropyl) amine methacrylimide, 4,4,9-trimethyl-4-azonia-7-oxo-8-oxa-9-decene-1-sulphonate, 1,1-dimethyl-1(2,3-dihydroxypropyl) amine methacrylimide, and maleic anhydride, said copolymer having been prepared by aqueous suspension polymerization in the presence of an anion emulsifier at a level above said emulsifier's critical micelle concentration.

17. The microspheres of claim 16 wherein at least one acrylate monomer is iso-octyl acrylate and the ionic monomer is ammonium acrylate.

18. The microspheres of claim 16 wherein at least one acrylate monomer is iso-octyl acrylate and the other monomer is maleic anhydride.

19. A suspension polymerization process of preparing the microspheres of claim 1 comprising the steps of:
charging to a reaction vessel, about 90 to about 99.5 percent by weight of one or more oleophilic, water-emulsifiable alkyl acrylate ester monomers, at least one of said esters being selected from the group consisting of iso-octyl acrylate, 4-methyl-2-pentyl acrylate, 2-methylbutyl acrylate, and sec-butyl acrylate, about 10 to about 0.5 percent by weight of one or more monomers selected from the group consisting of trimethylamine methacrylimide, trimethyl-amine p-vinyl benzimide, ammonium acrylate, sodium acrylate, N,N-dimethyl-N-($\beta$-methacryloxyethyl) ammonium propionate betaine, 1,1-dimethyl-1-(2-hydroxypropyl) amine methacrylimide, 4,4,9-trimethyl-4-azonia-7-oxo-8-oxa-9-decene-1-sulphonate, 1,1-dimethyl-1-(2,3- dihydroxypropyl) amine methacrylimide, and maleic anhydride, not greater than 0.6 weight percent of a substantially water-insoluble, oil-soluble polymerization initiator, water, and an anionic emulsifier at a level above its critical micelle concentration, agitating the reactor charge to create an emulsion, and heating said emulsion while maintaining said agitation, whereby elastomeric, non-polar organic liquid dispersible copolymer spheres are formed from said emulsion.

* * * * *

UNITED STATES PATENT OFFICE
CERTIFICATE OF CORRECTION

Patent No. 3,691,140             Dated September 12, 1972

Inventor(s)     Spencer Ferguson Silver

It is certified that error appears in the above-identified patent and that said Letters Patent are hereby corrected as shown below:

Cover page, first col., after Inventor: Spencer Ferguson Silver, delete "3M Center" and insert therefor - - assignor to Minnesota Mining and Manufacturing Company --.

Col. 7, line 1 should read -- 22.5 g. 4-methyl-2-pentyl acrylate --.

Col. 7, Claim 7, line 63 should read -- 4,4,9-trimethyl-4-azonia-7-oxo-8-oxa-dec-9-ene-1-sulfonate --.

Signed and sealed this 13th day of March 1973.

(SEAL)
Attest:

EDWARD M.FLETCHER,JR.                ROBERT GOTTSCHALK
Attesting Officer                    Commissioner of Patents